United States Patent [19]

Lieberman

[11] Patent Number: 4,829,880
[45] Date of Patent: May 16, 1989

[54] FLUID POWERED LINEAR SLIDE

[75] Inventor: Walter G. Lieberman, Irvine, Calif.

[73] Assignee: Adams Rite Products, Inc., Glendale, Calif.

[21] Appl. No.: 84,285

[22] Filed: Aug. 11, 1987

[51] Int. Cl.⁴ .................................... F15B 15/22
[52] U.S. Cl. .................................... 92/14; 92/13; 92/15; 92/110; 92/117 A; 92/117 R; 92/165 PR

[58] Field of Search .......... 92/13.1, 13.5, 11 D, 92/117 R, 117 A, 14, 15, 13.7, 18, 20, 165 PR, 166, 25, 88

[56] References Cited

U.S. PATENT DOCUMENTS

| | | | |
|---|---|---|---|
| 512,313 | 1/1894 | McDonald | 92/25 |
| 1,038,636 | 9/1912 | Oxnard | 92/117 R |
| 1,447,242 | 3/1923 | Fritz | 92/117 R |
| 1,809,615 | 6/1931 | Wilson | 92/25 |
| 1,845,797 | 2/1932 | Kearney | 92/117 R |
| 2,038,595 | 4/1936 | Noble | 92/88 |
| 2,627,846 | 2/1953 | Boedeker | 92/15 |
| 3,568,559 | 3/1971 | Fink | 92/117 A |
| 3,592,131 | 6/1971 | Otsuka | 92/166 |
| 3,822,635 | 7/1974 | Nishimura | 92/13.5 |
| 3,941,141 | 5/1974 | Robert | 92/18 |
| 4,020,745 | 5/1977 | Iijima et al. | 92/117 R |
| 4,351,628 | 9/1982 | Prexel et al. | 92/165 PR |

FOREIGN PATENT DOCUMENTS

| | | | |
|---|---|---|---|
| 577947 | 6/1946 | Canada | 92/14 |
| 646337 | 8/1962 | Canada | 92/13 |
| 2609649 | 9/1977 | Fed. Rep. of Germany | 92/13 |
| 1394281 | 5/1975 | United Kingdom | 92/165 PR |

Primary Examiner—Robert E. Garrett
Assistant Examiner—Thomas Denion
Attorney, Agent, or Firm—Whann & Connors

[57] ABSTRACT

Disclosed is a fluid powered linear slide employing either a rodless or rod-type cylinder. The slide includes a base which has a movable carriage mounted thereon which moves reciprocably in response to pressurized fluid being fed to the cylinder. In the embodiment employing a rod-type cylinder, a pair of tubular rods are mounted on the base in a fixed position and attached to a piston stationarily mounted inside the cylinder which is movably mounted and attached to the carriage. In the other embodiment, the carriage is mounted on a bracket which is attached to the rodless cylinder carried in the housing for the cylinder. The base has linear guideways therein, each guideway carrying one or more stop membes which are manually adjustable and electrically actuated. The stop members may be moved to any one of an infinite number of stop points along the guideway and are programable to be actuated or deactuated as desired by energizing an electrical coil which magnetizes a block that moves a latch arm into a position to stop the carriage.

11 Claims, 6 Drawing Sheets

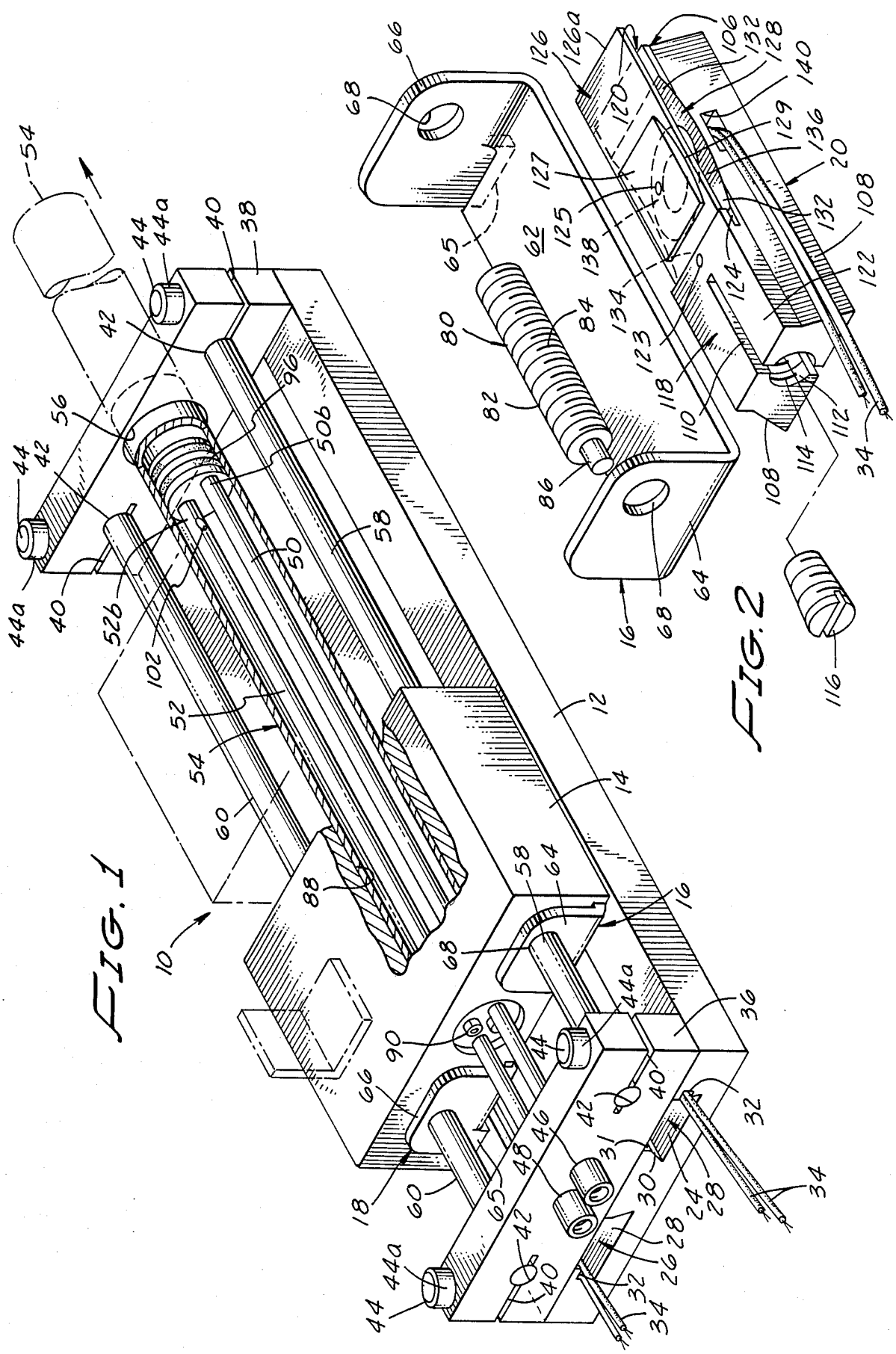

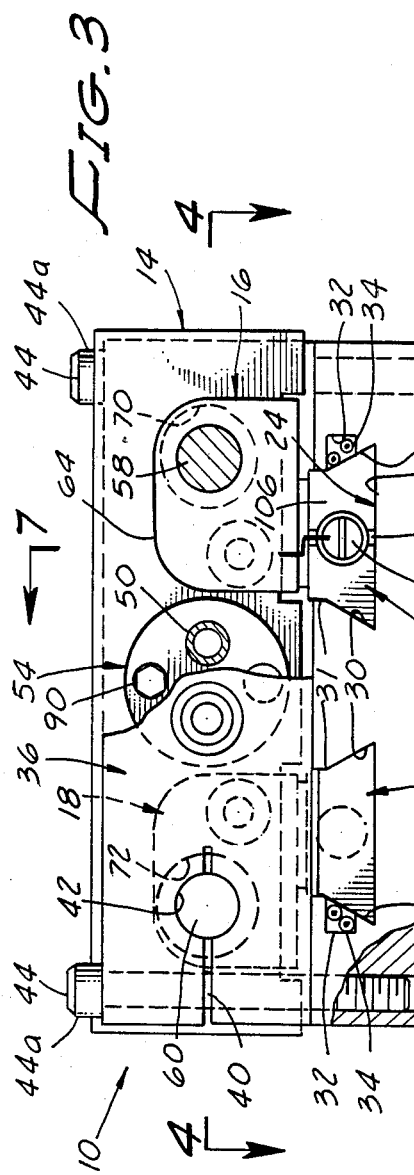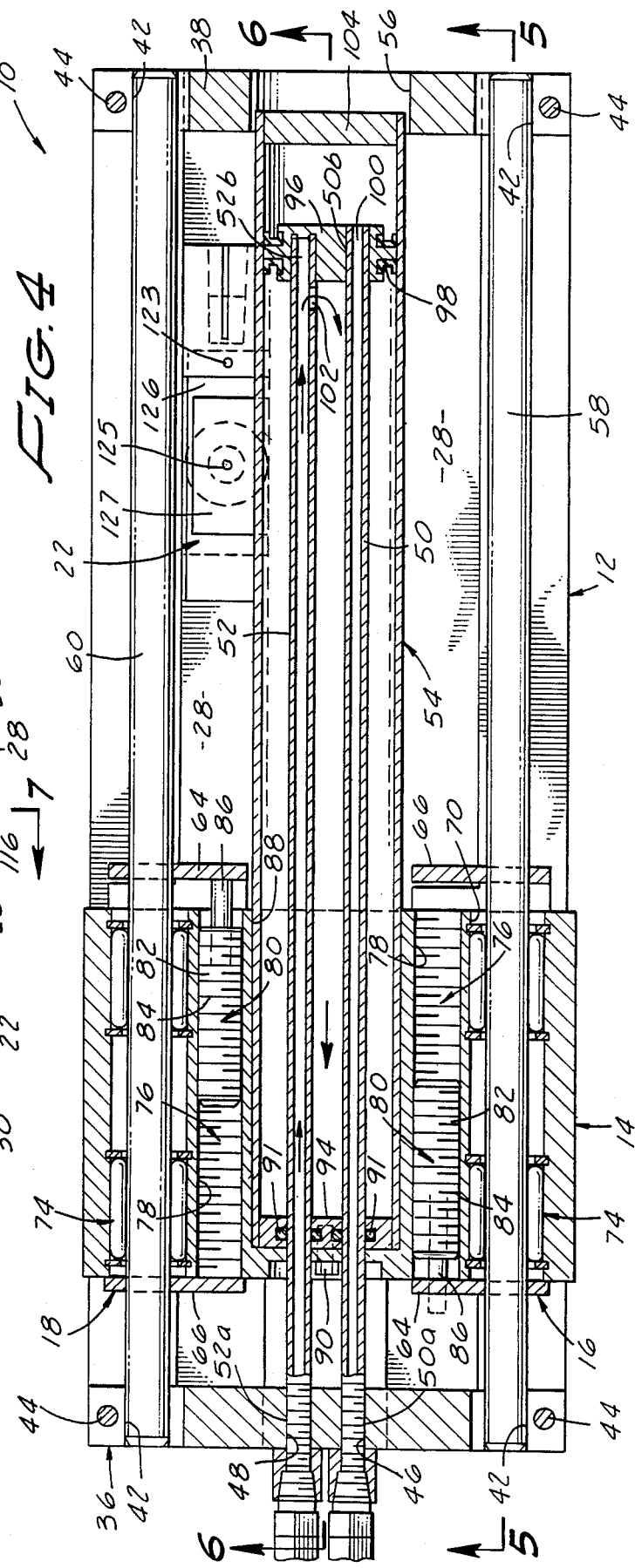

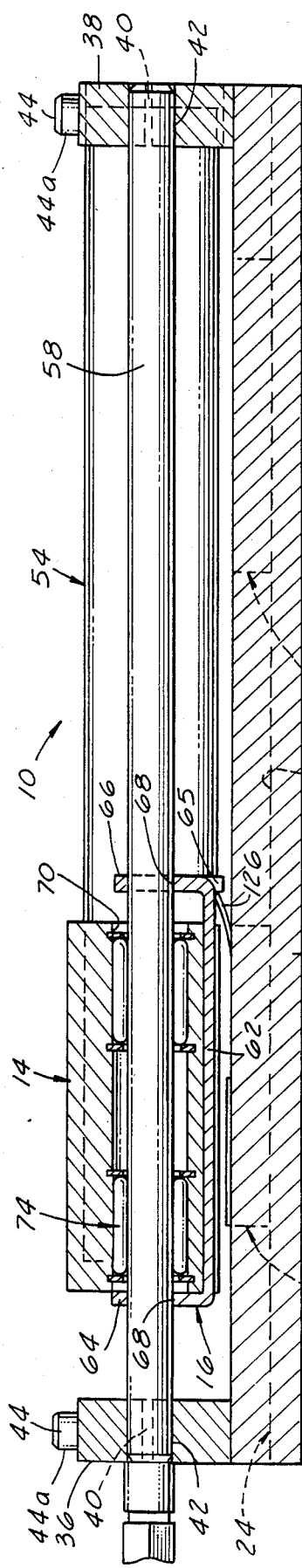
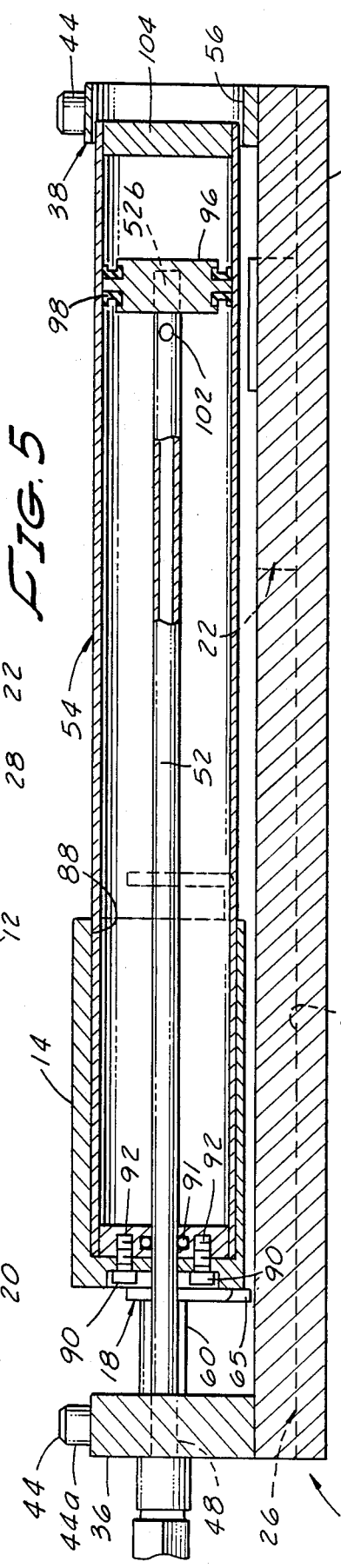
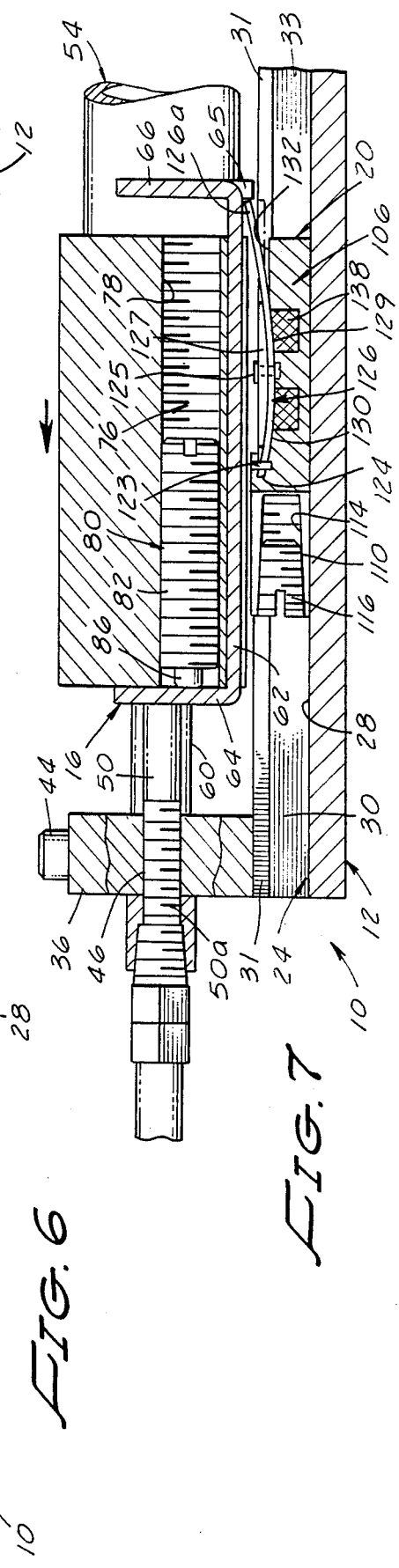

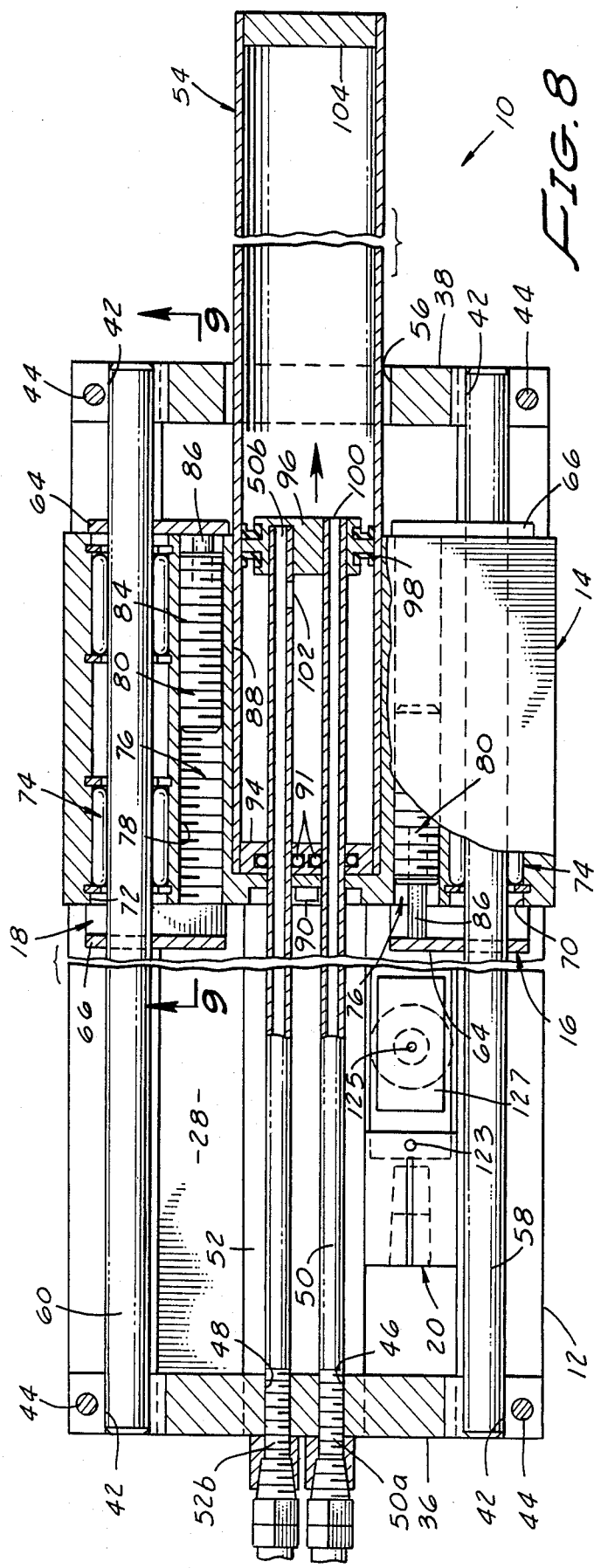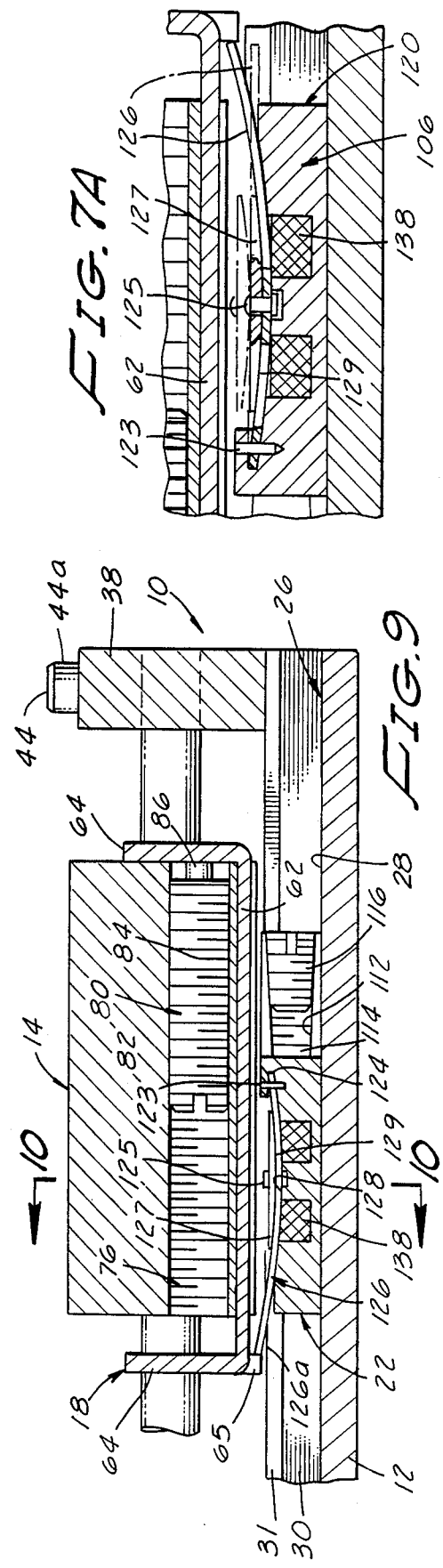

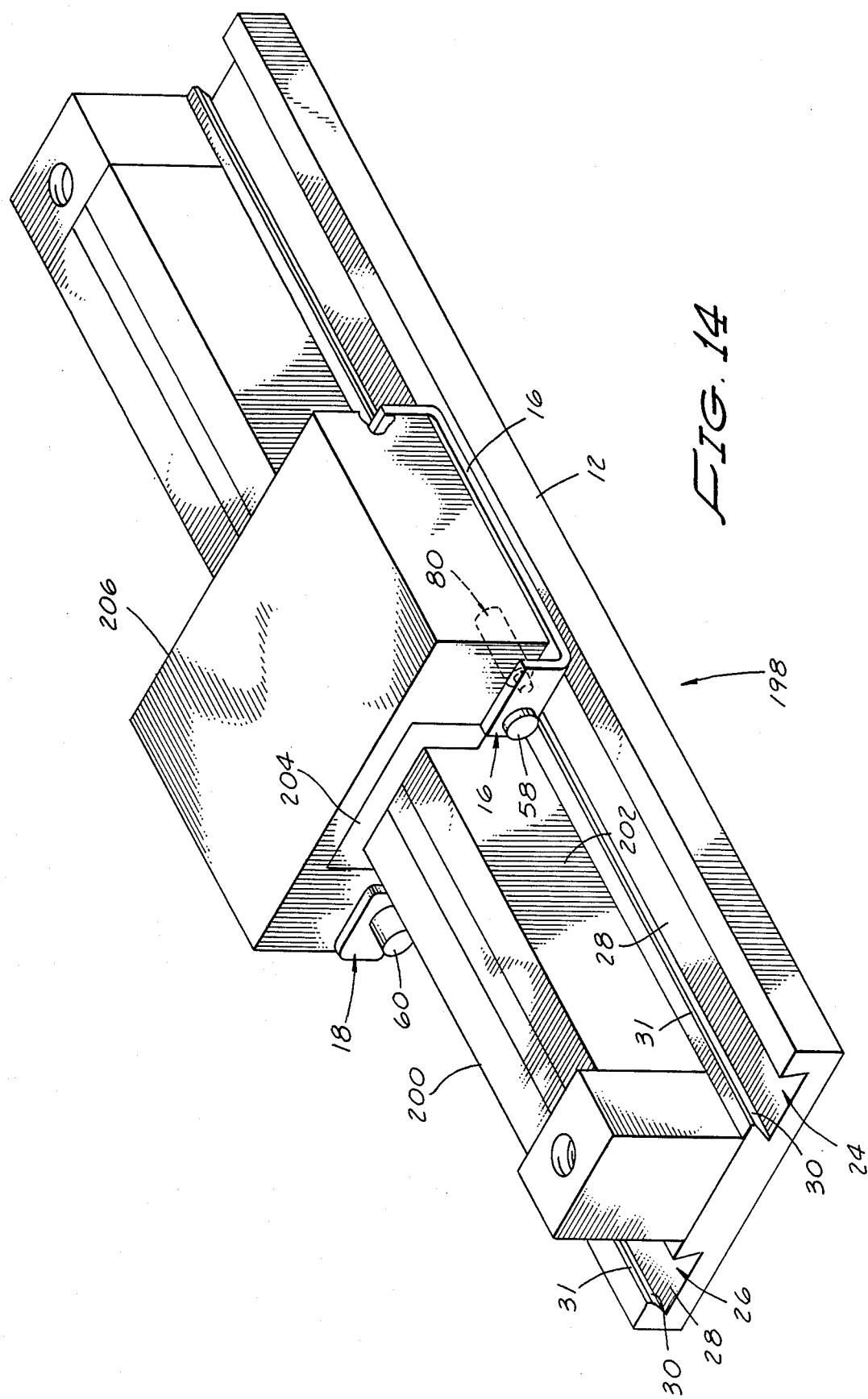

FLUID POWERED LINEAR SLIDE

BACKGROUND OF THE INVENTION

1. Field of the Invention:

This invention relates to a reciprocating slide, and particularly a reciprocating slide with manually adjustable, electrically actuated stops.

2. Background Discussion:

Fluid powered slides are used along assembly lines for moving parts into position. These slides include a reciprocally movable carriage which carries the part to the desired point on the assembly line. Typically, a robot is attached to the carriage and this robot picks up the part from storage and moves it to a precise location along the assembly line. These slides are ordinarily fluid powered and include a hydraulic or pneumatic cylinder which in response to fluid pressure moves the carriage first in one direction along its path of travel and then in the opposite direction along the same path of travel.

SUMMARY OF THE INVENTION

The present invention is an improvement in conventional fluid powered slide in that it is more compact than conventional slides, it eliminates flexible tubing for the power cylinder which tubing frequently tangles and breaks, it employs ajustable stops which can be manually moved to different stop points and is programmable in that the stops are selectively, electrically actuated, and it is low cost utilizing many standard or easy to manufacture components.

There are several features of this invention, no single one of which is solely responsible for its desirable attributes. Without limiting the scope of this invention as expressed by the claims, its more prominent features will now be discussed briefly. After considering this discussion, and particularly after reading the section of this application entitled "DETAILED DESCRIPTION OF THE PREFERRED EMBODIMENTS", one will understand how the features of this invention provide its advantages.

One feature of the present invention is the use of a movable cylinder into which extend stationary, hollow tubular piston rods connected to a stationary piston within the cylinder. The cylinder is secured to a reciprocably movable carriage. Typically, the cylinder has a length from about one to about three feet and it is carried on a base between two mounting end plates. There is an opening in one of the end plates through which the cylinder extends when the carriage has been moved in one direction along its path of travel to its extended position. When the carriage is moved in the opposite direction, the cylinder is retracted so that, at the end of this direction of travel, the cylinder has withdrawn between the mounting brackets. Thus, the overall length of the slide, with the cylinder retracted, is only slightly longer than the length of the cylinder.

The second feature of this invention is the use of stationary, hollow tubular piston rods which extend into the cylinder. Each rod has one end connected to the piston and another end extending out from the end of the cylinder opposite the piston. The ends of the tubular rods which extend beyond the cylinder are mounted to an end plate in a stationary position, and are each adapted to be connected to a source of pressurized fluid. The ends of the tubular rods connected to the piston each have a port therein. One rod has one port on one side of the piston. The other rod has a port on the opposite side of the piston. Thus, by selectively introducing fluid into one or the other of the exposed ends of the tubular rods, pressure is applied to one side of the piston. Depending on which side of the piston fluid pressure is applied, the carriage will move in one direction or the other.

The third feature of this invention is the use of one or more manually adjustable stops carried on the base of the slide. These stops are positioned in one or more linear guideways which enable the stops to be moved to an infinite number of positions along the linear path of travel of the carriage. When a stop has been moved into the desired position along the guideway, it is secured in position so that it will not move. Preferably, there is a stop provided for each direction of travel of the carriage and more than one stop may be located in each of the guideways, thus providing multiple stop points that are manually adjustable along the path of travel of the carriage.

The fourth feature of this invention is that each stop includes a latch arm which is electrically actuated. This enables the carriage to be stopped at selected points in accordance with any desired program. In other words, in some situations, the latch arm may be electrically actuated and in other instances the latch arm may remain unactuated, thus, allowing the carriage to move past the stop.

The fifth feature of this invention is the use of a bracket having a tab member extending outwardly to engage the latch arm when the latch arm is actuated. This bracket member has the carriage attached to it. The latch arm is elongated and wedged into position when actuated so that, on engaging the tab, the moving bracket immediately comes to a halt.

The sixth feature of this invention is the use of shock absorber means connected to the carriage which enable the carriage to come to a gradual stop even though the bracket stops immediately upon engaging the latch arm.

The preferred embodiments of this invention illustrating all its features will now be discussed in detail. These embodiments show the slide of this invention being used with both a cylinder employing a stationary piston and piston rods and a cylinder which does not employ piston rods.

BRIEF DESCRIPTION OF THE DRAWING

The slide of this invention as illustrated in the drawing, with like numerals indicating like parts, and in which:

FIG. 1 is a perspective view of the slide of this invention employing a movable cylinder with a stationary piston and stationary tubular piston rods.

FIG. 2 is an exploded view of a carriage bracket and associated manually adjustable stop assembly.

FIG. 3 is an end view showing the lefthand end of the slide illustrated in FIG. 1.

FIG. 4 is a cross-sectional view taken along line 4—4 of FIG. 3.

FIG. 5 is a cross-sectional view taken along line 5—5 of FIG. 4.

FIG. 6 is a cross-sectional view taken along line 6—6 of FIG. 4.

FIG. 7 is a cross-sectional view taken along line 7—7 of FIG. 3.

FIG. 7A is an enlarged, fragmentary, cross-sectional view of the stop.

FIG. 8 is a cross-sectional view similar to that shown in FIG. 4 except the cylinder has now been moved to its extended position with the cylinder extending outwardly from the righthand end of the side.

FIG. 9 is a cross-sectional view taken along line 9—9 of FIG. 8.

FIG. 14 is a perspective view of an alternate embodiment of this invention using a rodless cylinder to move the carriage reciprocally.

DETAILED DESCRIPTION OF THE PREFERRED EMBODIMENTS

Figure 10:
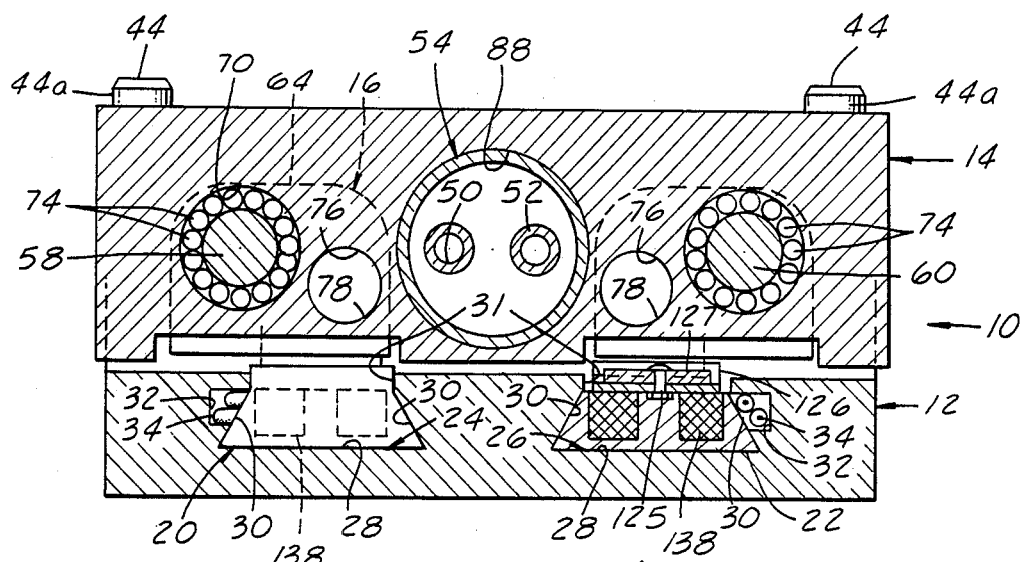
FIG. 10 is a cross-sectional view taken along line 10—10 of FIG. 9.

As illustrated in FIG. 1, the fluid powered slide 10 of this invention includes a base 12, a carriage 14, carried by a pair of brackets 16 and 18, that is mounted to move reciprocably along the longitudinal axis of the base, and adjustable stop elements 20 (FIG. 2) and 22 (FIG. 3).

The base 12 is a generally flat planar member having a rectangular configuration, preferably made of extruded aluminum. The base 12 is cut into appropriate lengths corresponding to the maximum length of travel of the carriage. A pair of elongated channels 24 and 26 serving as guideways extend lengthwise along a straight line which is parallel to the longitudinal axis of the base. Each channel 24 and 26 respectively has a flat bottom 28 with inwardly tapered side walls 30 that terminate in flat wall sections 31 that are generally at right angles to the top of the base. The base may be mounted to any support structure and oriented along any axis of a three axes coordinate system. In the outside tapered side wall 30 of each channel is a raceway 32 which extends lengthwise along this wall and accommodates conductors 34 which are connected to the stop element seated in the channel (FIGS. 2 and 3). Although one stop element is shown seated in each channel, multiple stop elements could be disposed in each of these channels 24 and 26.

Disposed at each end of the base 12 are outwardly projecting end plates 36 and 38. Each end plate has a slit 40 therein, with the inward portion of each slit having an enlarged cylindrical opening 42 therein. A pair of holes (not shown) are drilled through the sides of the end plates and these accommodate threaded post members 44 which are screwed into the base 12 to hold the end plates securely in position. The one end plate 36 has a pair of holes 46 and 48 therein which accommodate respectively the exposed ends 50a and 52a of hollow tubular rods 50 and 52 that are connected to a fluid powered cylinder 54 that drives the carriage 14. The other end plate 38 has an enlarged central opening 56 therein which enables the cylinder 54 to pass therethrough as the carriage 14 moves reciprocally between the retracted position shown in FIG. 1 and the extended position shown in FIG. 8.

The carriage 14 is mounted for reciprocal movement on a pair of spaced apart solid, cylindrical bars 58 and 60 which carry respectively the brackets 16 and 18. The opposed ends of each bar 58 and 60 are received in the enlarged cylindrical openings 42 in the end plates 36 and 38. When the posts 44 are secured to the base and end caps 44a thereof are tightened, the bars 58 and 60 are gripped firmly in the slits 40 and are prevented from moving relative to the base 12. Each bar 58 and 60 carries respectively bracket 16 and 18. As best shown in FIG. 2, each bracket 16 and 18 has a generally U-shaped configuration with a bottom wall 62 having two outwardly extending side walls 64 and 66 having aligned openings 68 therein which receive a bar.

As best shown in FIG. 4, the carriage 14 has a pair of spaced elongated openings 70 and 72 which are aligned with and receive, respectively, the bars 58 and 60. Seated within these openings 70 and 72 are bearing members 74 which enable the carriage 14 to smoothly ride along the bars 58 and 60 as it is moved reciprocally by the power cylinder 54. There are a pair of spaced cylindrical channels 76 with threaded side walls 78 in the carriage 14, with each channel receiving a shock absorber 80. Each shock absorber includes a housing 82 having external threads 84 thereon which enable the shock absorbers to be screwed into position in the channels 76. Each shock absorber includes an outwardly extending plunger 86 which engages one of the sidewalls 64 or 66 of the brackets 16 and 18. As will be described in greater detail below, these shock absorbers 80 permit the carriage 14 to move under the force of its own momentum after a bracket has come to an instantaneous stop upon engagement with a stop element.

The fluid powered cylinder 54 is received in an elongated cylindrical passageway 88 centrally located in the carriage 14. As best shown in FIG. 6, the cylinder 54 has its one end secured to the carriage 14 by retainer nuts 90 that grasp screw elements 92 extending from the one end plate 94 of the cylinder. Extending through this end plate 94 are the elongated straight tubular rods 50 and 52. Seals 91 are provided to prevent leakage of the fluid past the rods 50 and 52. The unexposed ends 50b and 52b of the rods are, as best shown in FIG. 4, securely attached to a stationary piston 96. This piston 96 has along its circumference a seal 98 which fits snug against the internal wall of the cylinder 54. Each rod 50 and 52 has, respectively, a port 100 and 102 at the end where it is connected to the piston. The port 102 in the one rod 52 is on the lefthand side of the piston 96 as shown in FIG. 4 and the port 10 in the other rod 50 is on the righthand side of the piston as shown in FIG. 4.

The cylinder 54 and attached carriage 14 move reciprocally between the retracted position shown in FIG. 4 and the extended position shown in FIG. 8 in response to fluid being selectively fed into the rods 50 and 52. Thus, if fluid under pressure is introduced into the tubular rod 52, it flows along the length of this tubular rod out the port 102 to apply pressure to the lefthand plate 94 of the cylinder, moving the cylinder to the retracted position in FIG. 4. With fluid being introduced into the other tubular rod 50, fluid under pressure will be applied to the other end plate 104 of the cylinder 54, causing the cylinder and carriage 14 to move to the extended position in FIG. 8. Because the tubular rods 50 and 52 used to introduce pressurized fluid into the cylinder 54 are stationary there is no possibility that they would become entangled. Using such tubular rods 50 and 52 in combination with the stationary piston 96 and movable cylinder 54 also provides for a more compact slide 10, since the cylinder in the retracted position will be moved between the end plates 36 and 38 and in the extended position will move substantially its entire length beyond the one end plate 38 through the opening 56 in this plate.

As best illustrated in FIGS. 2, 7 and 9, the stop element 20 includes a ferrous metal block 106 which has inwardly tapered side walls 108 that compliment the tapered side walls 30 of the channels 24 and 26 to enable the block to fit snugly in the channels but allow the block to be moved manually laterally within the channel. A slot 110 cut along the longitudinal axis of the block and having a central receptacle section 112 with an inwardly tapered threaded side wall 114 accommodates a threaded expander plug 116 which is tightened when the block has been moved to the desired position along a channel. Tightening of the expander plug 116 forces the side walls 114 of the block 106 to press firmly against the side walls 30 of the channels 24 and 26 to prevent further movement of the block within a channel.

As shown in FIG. 2, the upper portion of the block 106 has two sections: a mounting section 118 and a carrier section 120. The mounting section 118 includes a raised end piece 122 having a groove 124 extending crosswise to the longitudinal axis of the block which receives and holds one end of a flexible metal latch arm 126. A pin 123 secures the end of the arm 126. This latch arm 126 has a generally rectangular configuration, with the long portion of the latch arm being generally aligned with the channel. Since the latch arm 126 is substantially longer than wide, it has a high aspect ratio rendering it very rigid in the lengthwise direction. As will be apparent hereafter, this rigidity facilitates stopping a bracket at a precise location along the channel.

The carrier section 120 includes an indentation 128 formed by two spaced apart support elements 130 and 132 having inwardly tapered side walls 134 leading to the bottom 136 of the indentation. Seated in the block 106 immediately below the latch arm 126 in the indentation 128 is a copper coil 138 connected to the insulated conductors which extend from an opening 140 in the tapered wall 108. As best shown in FIG. 7A, resting on top of the latch arm 126 and held in position by a pin 125 is a magnetic plate 127. This plate 127 has a cylindrically shaped under side 129 that conforms to the cylindrical surface of the indentation 128. Normally, the latch arm 126 is unflexed as shown in dotted lines in FIG. 7 and lies over but not touching the coil 138. Upon applying electrical current to the coil 138, the block 106 is magnetized and the magnetic plate 127 is pulled towards the indentation 128 to force the latch arm 126 inwardly, bending it as shown in FIG. 7 to move the tip 126a of the latch arm 126 into the path of the moving bracket. The tab 65 engages the end 126a of the latch rm 126 to stop the carriage 14. Thus, the latch arm 126 is moved due to the influence of the magnetic field produced upon energization of the coil 138 to stop the carriage 14.

ASSEMBLY AND OPERATION

The fluid power slide 10 of this invention is easy to assemble and operate. With the end plates 36 and 38 secured in position at the ends of the base 12 the bars 58 and 60 are slipped into the openings 42 after the carriage 14 and brackets 16 and 18 are attached thereto by sliding the bar through the openings 70 and 72 in the carriage. The post members 44 are secured after the ends 42 of the bars have been extended through the openings 42. Initially, the stop elements 20 and 22 are placed in position in the channels 24 and 26, one stop element being placed in channel 24 at the desired stop point and the other placed in the other channel 26 at the desired stop point. The expander plugs 116 are then tightened to prevent movement of the blocks 106 relative to the base 12. Since an inexpensive base 106 is employed which may be cut into any desired length, it is easy to make custom built slides from conventional components which would permit a wide variety of differing slide lengths.

In operation, the carriage 14 moves first in one direction towards the end plate 36 and then in the opposite direction towards the end plate 38 in response to fluid being fed alternately between the rods 52 and 50. When fluid is fed under pressure into rod 52 as shown in FIG. 4, the carriage moves to the left as shown in FIG. 4 until the wall 64 of the bracket engages the inside wall of the end plate 36. With the stop element 20 energized as shown in FIG. 7, the latch arm 126 engages the tab 65 to bring the bracket 16 to a halt before the bracket will engage the sidewall of the end plate 36. Pressure will be continually applied to the plate 94 of the cylinder to continue to move the carriage 14 towards the bracket side wall 64, but the shock absorber 80 slows down the movement of the carriage, bringing it to a gentle stop by depressing the plunger 86 inwardly until the carriage engages the inside of the side wall 64 of the bracket 16. As shown in FIG. 4, the plunger 86 of the other shock absorber 80 carried by bracket 18 is now in a fully outwardly extended position, moving to this position under the force of a internal spring (not shown). When the carriage 14 is moved in the opposite direction and then brought to a halt as shown in FIG. 8, this plunger 86 will be depressed with its shock absorber 80 cushioning the stop of the carriage.

In accordance with this invention several spaced apart stop elements could be placed in a channel to enable the carriage 14 to be stopped at a precise location at several different points along its linear path of travel. None of these stop elements could be energized, permitting the end plates 36 and 38 to act as stop members for the brackets and carriage, or any one, or several, could be energized by sending electrical current through the conductors to energize the coils 138 and magnetize the blocks 106, pulling the latch arms 126 inwardly so that the tips 126a will engage the tabs 65 as the brackets move to the selected stop points.

ALTERNATE EMBODIMENTS

Figure 11:
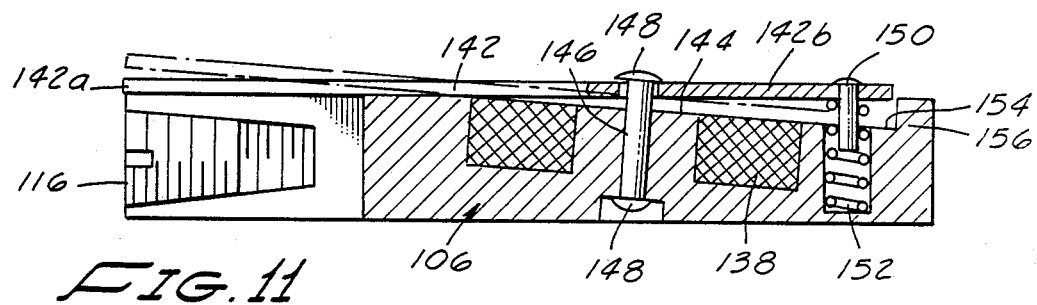
FIG. 11 is a cross-sectional view of a second embodiment of the stop assembly used to halt the movement of the bracket carrying the carriage.
Figure 12:
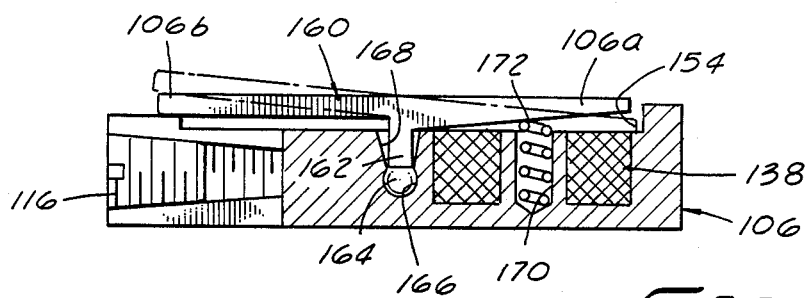
FIG. 12 is a cross-sectional view of a third embodiment of the stop assembly used to halt the movement of the bracket carrying the carriage.
Figure 13:
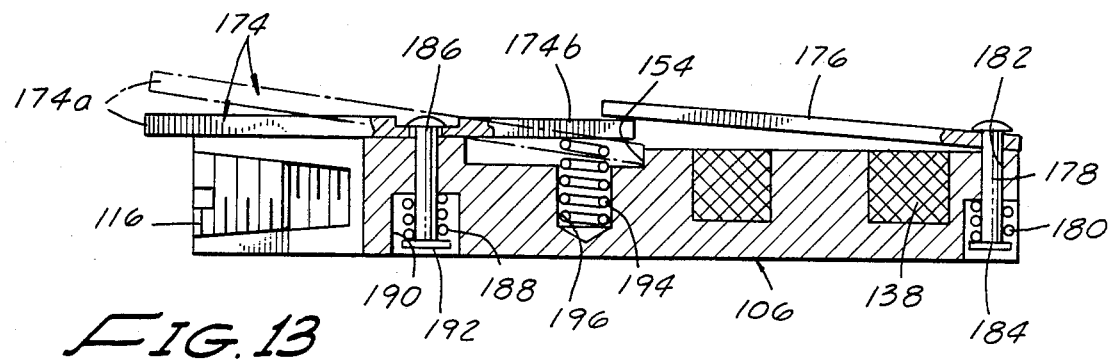
FIG. 13 is a cross-sectional view of a fourth embodiment of the stop assembly used to halt the movement of the bracket carrying the carriage.

FIGS. 11, 12 and 13 show three alternate types of stop elements all employing a ferrous metal block 106 carrying a copper coil 138 which is selectively energized to move a latch arm into the path of the tab 65 of a bracket.

FIG. 11 shows a second embodiment of a stop element employing a latch arm 142 that normally lies in a flat position resting on the top of the block 106. The block 106 has a downwardly slanting groove 144 in its top surface that enables the latch arm 142 to be tilted about a post 146 which holds the latch arm 142 in position but enables it to be tilted in an out of the linear path of travel of the bracket. The post 146 extends through the center of the coil 138 and has end caps 148 which hold the post and latch arm in position. At the end 142b of the latch arm 142 opposite the stopping tip 142a is a pin 150 which extends into the center portion of a coiled return spring 152. This end 142b is seated and abuts a generally 90 degree miter corner 154 formed by an upwardly projecting end piece 156 and the base of the groove.

FIG. 12 shows a third embodiment of a stop element employing a generally T-shaped latch arm 160 with the leg 162 of the T having a cylindrical member 164 received in a cylindrical groove 166 in the block 106. This cylindrical groove 166 generally is at a 90 degree angle with respect to the longitudinal axis of the block 106 and the cylindrical member 164 is force fitted into this groove 166. The groove 166 has outwardly tapering side walls 168 that enable the latch arm 160 to tilt to and fro between a generally flat position shown in solid lines and a upwardly tilted position for stopping the linear movement of the bracket. Like the embodiment shown in FIG. 10, there is a miter corner 154 in which the one end 160a of the latch arm opposite its stopping tip 160b is received when the coil 138 is energized. Centrally located in a hole 170 in the center of the coil 138 is a return spring 172 which normally biases the latch arm 160 so that it is the position shown in solid lines.

FIG. 13 shows the fourth embodiment of a stop element employing two arm sections, one of them serving as a latch arm 174, the other serving as an armature 176 which coacts with the coil 138. The armature 176 has one end pivotably connected to a pin 178 which has a spring 180 wound about the end of the pin extending through a hole 182 in the block. There is a cap 184 on the end of the pin 178 which holds the spring 180 in position. The other end of the armature 176 engages the end 174b of the latch arm which does not act as the stopping tip 174a. In this embodiment, the latch arm 174 is mounted to tilt about a pivot post 186 which extends through the block 106 and has a coiled spring 188 lodged in a recess 190 which normally pulls the latch arm towards the block and maintains it snug against the top of the block. A cap 192 holds the spring 188 in position. At the overlap where the armature 176 and latch arm 174 engage, there is a return spring 194 received in a cavity 196 in the block 106 which normally pushes upwardly against the one end 174b of the latch arm 174 to hold the latch arm in the flat position and the armature in the raised position shown. Upon energization of the coil 138, the armature 176 is pulled against the top of the block 106, causing the latch arm 174 to pivot and move into the dotted position as shown in FIG. 13. When the coil 138 is deenergized, the return spring 194 pushes the latch arm 174 upwardly returning it to the position shown in solid lines. The latch arm end 174b is received in a miter corner 154 that wedges the arm 174 in position as it engages the tab 65 of a bracket.

FIG. 14 illustrates an alternate embodiment of this invention, a slide 198 employing a rodless cylinder (not shown) of the type described in U.S. Pat. No. 4,545,290. The advantage of using the rodless cylinder is that the slide 198 is adapted to move a carriage 206 mounted to the cylinder over a distance well in excess of three feet, for example, up to and even in excess of thirty feet. The slide 198 includes an elongated flat base 12 having a housing 202 mounted thereon. An inverted U-shaped bracket 204 is carried on the exterior of the housing 202 and mounted to the rodless cylinder. Thus, as the cylinder moves within the housing 202, the bracket 204 moves reciproclly. A carriage 206 is attached to this bracket 204 which also has a generally U-shaped configuration. At the ends of the legs of the carriage 206 are brackets 16 and 18 of the type shown in FIG. 2 including shock absorbers 80 and having bars 58 and 60 which extend between the side walls of the bracket through the legs of the carriage. There are one or more stop elements (not shown) mounted in the channels 24 and 26 extending lengthwise along the base 12. As discussed above, these stop elements are manually adjustable to select stop points for the carriage along its linear path of travel and are electrically energized in accordance with any desired program.

SUMMARY

As described above, the slide of this invention may be a compact relatively short unit not in excess of about three feet which employs stationary tubular piston rods 50 and 52 secured to a stationary piston 96 lodged within a movable cylinder 54 that moves reciprocally with the carriage 14. The elongated stationary rods 50 and 52 are inflexible and, thus, do not become tangled. The cylinder 54 moves outwardly in one direction from the end of the base and then is retracted so that substantially all the cylinder is within the ends of the base. When a longer slide is required, a rodless cylinder-type slide is employed where the carriage 206 is mounted to the cylinder and moves reciprocally therewith but has brackets 16 and 18 attached thereto which overlie one or more manually adjustable stop elements received in the base. By moving the stop elements to different positions along the path of travel and selectively energizing these stop elements, the carriage 206 may be stopped precisely at any point along its path of travel.

SCOPE OF THE INVENTION

The above description presents the best mode contemplated of carrying out the present invention. This invention is, however, susceptible to modifications and alternate constructions from the embodiments shown in the drawing and described above. Consequently, it is not the intention to limit this invention to the particular embodiments disclosed. On the contrary, the intention is to cover all modifications and alternate constructions coming within the spirit and scope of the invention as generally expressed by the claims.

I claim:
1. A fluid powered linear slide including
    a base,
    a carriage member mounted on the base to move reciprocably along a linear path between spaced apart terminals,
    manually adjustable, selectively actuated stop means mounted on the base to be moved to a plurality of different positions between said terminals, said stop means upon being actuated stopping movement of the carriage member,
    a fluid power cylinder secured to the carriage member and movable therewith, with the longitudinal axis of the cylinder being parallel to said linear path,
    a stationary piston disposed within the cylinder, said cylinder and piston coacting in response to pressurized fluid being introduced into the cylinder to move the carriage first in one direction along said linear path and then along said linear path in an opposite direction by applying said pressurized fluid to opposite sides of the piston,
    a pair of stationary tubes extending into the cylinder, each tube having one end adapted to be connected to a source of the pressurized fluid and an opposed end connected to the piston, said end connected to the pistons, each having port means thereat, with one port means being on one side of the piston and the other port means being on the opposite side of the piston, and means for selectively actuating the stop means.

2. The slide of claim 1 including shock absorber means connected to the carriage member to bring the carriage member to a slow stop when engaging an activated stop.

3. A fluid powered linear slide including a base having first and second mounting plates, one of said plates being at one end of the base and the other plate at the opposite end of the base with said plates extending outwardly from the base from the same side of the base, a pair of spaced apart bars extending lengthwise between the mounting plates and secured thereto, a pair of bracket members, one bracket member being carried on each bar and slidably and reciprocably movable along said bar, a carriage mounted on the brackets and movable as said brackets move along a linear path as they slide along the bars, a fluid powered cylinder mounted securely to the carriage and movable therewith between a retracted position where a substantial portion of the cylinder is disposed between the mounting plates and an extended position where a substantial portion of the cylinder extends beyond the first mounting plate, a stationary piston disposed within the cylinder near the first mounting plate, a pair of elongated, generally linear tubular members extending through the second mounting plate into the cylinder generally parallel to the longitudinal axis of the cylinder, each tubular member having an exposed end terminating at the second mounting plate which is adapted to be connected to a source of pressurized fluid and an enclosed end connected to the piston, said enclosed ends each having port means thereat, with one port means being on one side of the piston and the other port means being on the opposite side of the piston, and stop means mounted between said mounting plates engaging and disengaging the bracket to control the distance the carriage moves along said linear path, said stop means being manually adjustable to be moved and then secured at selected stop points along said linear path between said mounting plates, said stop means including latch means which is electrically actuated to engage the bracket and stop the movement of the carriage, said latch means including a magnetic latch element pivotably mounted on a block made of a ferrous metal which becomes magnetized upon actuation of the stop member.

4. The slide of claim 3 including shock absorber means to bring the carriage to a slow stop.

5. A fluid power linear slide including a base, a carriage member mounted on the base to move reciprocably along a linear path between spaced apart terminals, fluid power means connected to the carriage member to move said carriage along said linear path selectively in one of two directions, stopping means mounted to the base for stopping the carriage member at a selected stop point along said linear path between said terminals, said stopping means being manually adjustable to preset the stop point at any one of an infinite number of possible stop points along said linear path between said terminals and selectively actuated and deactuated, said stopping means stopping said carriage when actuated, and means for selectively actuating and deactuating the stopping means.

6. The slide of claim 5 wherein the stopping means includes a latch arm which moves into the linear path to engage the carriage member when actuated.

7. The slide of claim 6 wherein said stopping means includes a member made of a ferrous metal which is magnetized when the stopping means is electrically actuated and the latch arm is made of a magnetic material which is moved to a stop position by being attracted to the magnetized metal.

8. A fluid powered linear slide including a base having a linear guideway, a carriage member mounted on the base to move reciprocably along a linear path between a pair of spaced apart terminals, said linear path being generally parallel to the linear guideway, fluid power means connected to the carriage member to move said carriage member along said linear path selectively in one of two directions, a stop element mounted to the base and manually movable along said guideway and adapted to be moved to and secured in a fixed position at a preselected stop point at any one of an infinite number of possible stop points along said guideway between said terminals, with said stop element including a selectively actuated latch member which, upon actuation, is disposed in the path of the carriage member to stop the carriage at the preselected stop point and, upon deactivation, is moved from the path to allow the carriage to move past the stop point, and means for selectively actuating the latch member.

9. The slide of claim 8 wherein the latch member is a rigid arm that is mounted to move pivotably between a position out of the path of movement of the carriage to a position in the path of the movement of the carriage where the latch member has one end seated in a block and wedged in a miter corner in the block and the other end is free to engage and stop the movement of the carriage.

10. The slide of claim 9 wherein the block is made of a ferrous metal and includes a coil which upon energization with electricity magnetizes the block and the latch member is made of a magnetic material which is attracted to the block to move the latch member into the stop position.

11. The slide of claim 8 including shock absorber means connected to the carriage member to bring the carriage member to a slow stop when engaging an activated stop element.

* * * * *

UNITED STATES PATENT OFFICE
CERTIFICATE OF CORRECTION

Patent No. 4,829,880          Dated May 16, 1989

Inventor(s) Walter G. Lieberman

It is certified that error appears in the above-identified patent and that said Letters Patent is hereby corrected as shown below:

on cover page, page 1, item (73) after "Assignee:"

delete "Adams Rite Products, Inc. Glendale, Calif."

Signed and Sealed this

Eighth Day of May, 1990

Attest:

HARRY F. MANBECK, JR.

*Attesting Officer*      *Commissioner of Patents and Trademarks*